(12) United States Patent
Mikonaho (10) Patent No.: US 8,091,695 B2
(45) Date of Patent: Jan. 10, 2012

(54) DAMPENING ELEMENT OF A VIBRATION DAMPER AND A VIBRATION DAMPER

(75) Inventor: Heikki Mikonaho, Turku (FI)

(73) Assignee: Wärtsilä Finland Oy, Vaasa (FI)

( * ) Notice: Subject to any disclaimer, the term of this patent is extended or adjusted under 35 U.S.C. 154(b) by 1065 days.

(21) Appl. No.: 11/916,841

(22) PCT Filed: May 22, 2006

(86) PCT No.: PCT/FI2006/050205
§ 371 (c)(1),
(2), (4) Date: Dec. 7, 2007

(87) PCT Pub. No.: WO2006/131596
PCT Pub. Date: Dec. 14, 2006

(65) Prior Publication Data
US 2008/0191398 A1 Aug. 14, 2008

(30) Foreign Application Priority Data
Jun. 9, 2005 (FI) ...................... 20055299

(51) Int. Cl.
*F16F 15/027* (2006.01)
(52) U.S. Cl. ........ 188/380; 188/274; 188/276; 188/313; 188/319.2

(58) Field of Classification Search .................. 188/313, 188/315, 322.13–322.15, 378–380, 319.2, 188/322.5, 276
See application file for complete search history.

(56) References Cited

U.S. PATENT DOCUMENTS

| | | | | |
|---|---|---|---|---|
| 2,854,100 | A | * | 9/1958 | Oiley et al. .................. 188/316 |
| 4,877,225 | A | | 10/1989 | Noguchi et al. |
| 5,150,775 | A | * | 9/1992 | Charles et al. ............. 188/266.3 |
| 5,558,190 | A | * | 9/1996 | Chang .......................... 188/312 |
| 6,443,273 | B1 | | 9/2002 | Ledbetter et al. |

* cited by examiner

Primary Examiner — Robert Siconolfi
Assistant Examiner — Anna Momper
(74) Attorney, Agent, or Firm — Chernoff, Vilhauer, McClung & Stenzel (57) ABSTRACT

A dampening element for a vibration damper and a vibration damper. The dampening element comprises a body part having flow openings, a dampening part arranged to abut against the body part, the dampening part having openings aligning with the flow openings of the body part. In addition, a cover part is arranged against the dampening part, the cover part being movable in relation to the dampening part for changing the cross-sectional flow area of the openings of the dampening part.

8 Claims, 6 Drawing Sheets

DAMPENING ELEMENT OF A VIBRATION DAMPER AND A VIBRATION DAMPER

CROSS-REFERENCE TO RELATED APPLICATIONS

This is a national stage application filed under 35 USC 371 based on International Application No. PCT/FI2006/050205 filed May 22, 2006, and claims priority under 35 USC 119 of Finnish Patent Application No. 20055299 filed Jun. 9, 2005.

BACKGROUND OF THE INVENTION

The present invention relates to a dampening element of a vibration damper.

The invention also relates to a vibration damper.

The vibration of a piston engine is known as such, and in order to reduce it there are a number of various solutions, such as balancing solutions. In engines there can be noted vibration forms of which both the engine and the auxiliary devices attached in connection therewith, such as a compressor or compressors, are part of. In this case it is a matter of a global vibration form, i.e. the engine and its auxiliary constructions together form a vibration system. The engine can also have local vibrations of a certain auxiliary apparatus, whereby the dynamic properties of the auxiliary apparatus are in determining position as far as the vibration is concerned.

Control of local vibrations is usually easier than control of global vibrations of the whole construction. In local vibration the rigidity, fastening, mass etc. of the structure in question can be modified more easily. In the control of the global vibration of the engine, however, the need for modification can be directed at the engine itself, whereby it may be required to increase the rigidity of the cylinder block etc. This is impossible in case there is a desire to use standard engine components. The viewpoint of costs must also be considered when looking for new solutions.

In all types of vibration, mainly the mass and gas forces of the engine act as a stimuli. A special difficulty in vibration dampening of engines is that the vibration properties of engines of different sizes (number of cylinders, cylinder diameter etc.) differ from each other. Further, the engine running speed also has an effect on the vibration.

Dampers have been developed for dampening the vibrations in which an oscillating piece supported by springs is allowed to move in a space filled with a dampening medium, such as gas or fluid. The reciprocating movement of the oscillating piece causes the dampening medium to move. The movement of the oscillating piece and thereby also the vibration of the component in connection with which the damper is arranged, are attenuated by converting the kinetic energy and pressure energy of the dampening medium into heat.

In order to achieve an optimal dampening the operation parameters of the damper must be adjusted. The operation parameters of the damper can be arithmetically defined and preset into the damper, but often the fine tuning needed for achieving optimal dampening must be carried out during the runtime of the object to be dampened.

SUMMARY OF THE INVENTION

The object of the invention is to produce a solution by means of which the dampening properties of the vibration damper filled with a dampening medium can easily be changed.

The aims of the invention are achieved by means of a dampening element that can be arranged in connection with the vibration damper, the dampening element comprising a body part having flow openings and a dampening part to be arranged against the body part, the dampening part having openings arranged so as to be aligned with the openings of the flow openings of the body part. The dampening element additionally comprises a cover part arranged against the dampening part, the cover part being movable in relation to the dampening part for changing the cross-sectional flow area of the openings of the dampening part.

Considerable advantages can be achieved by means of the invention.

The dampening parameters of the dampening element according to the invention can be steplessly changed by moving the cover part, whereby the dampening properties of the damper can be accurately adjusted so as to be desirable. The adjustment range of the dampening element can, if necessary, be changed by installing into the dampening element a different dampening part with a different number of openings and/or openings of a different size. Further, the dampening element according to the invention can be designed so as to be of a simple construction and inexpensive to produce.

In one embodiment the cover part comprises means for moving the cover part from outside the damper. Thus the fine-tuning of the dampening can often be carried out during the operation of the component to be dampened, which makes it easier to find and set an optimal dampening.

BRIEF DESCRIPTION OF THE DRAWINGS

In the following, the invention is described in more detail by means of an example according to the appended drawings.

DETAILED DESCRIPTION

Figure 1:
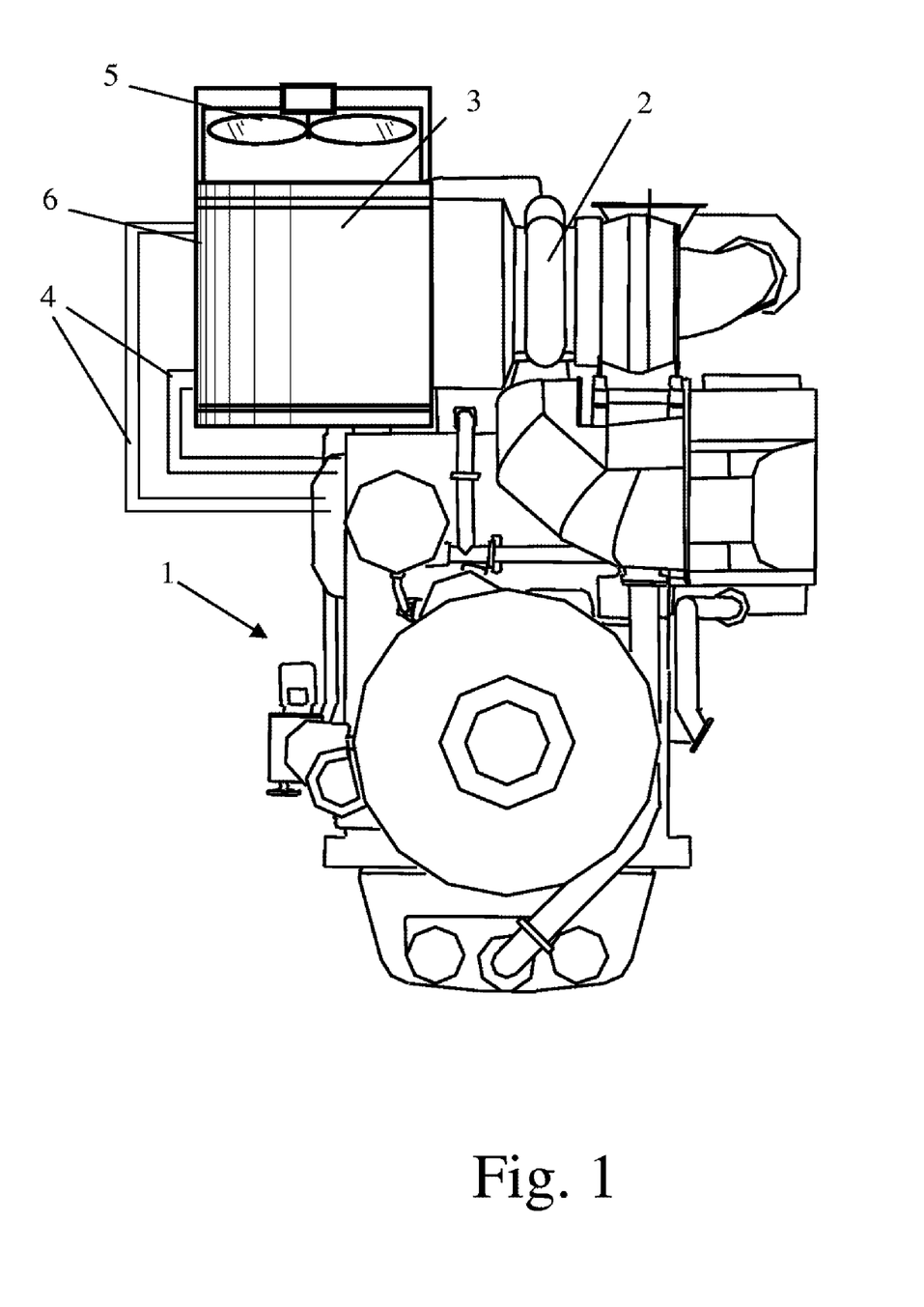
FIG. 1 illustrates one vibration damper according to the invention in connection with a piston engine.
Figure 2:
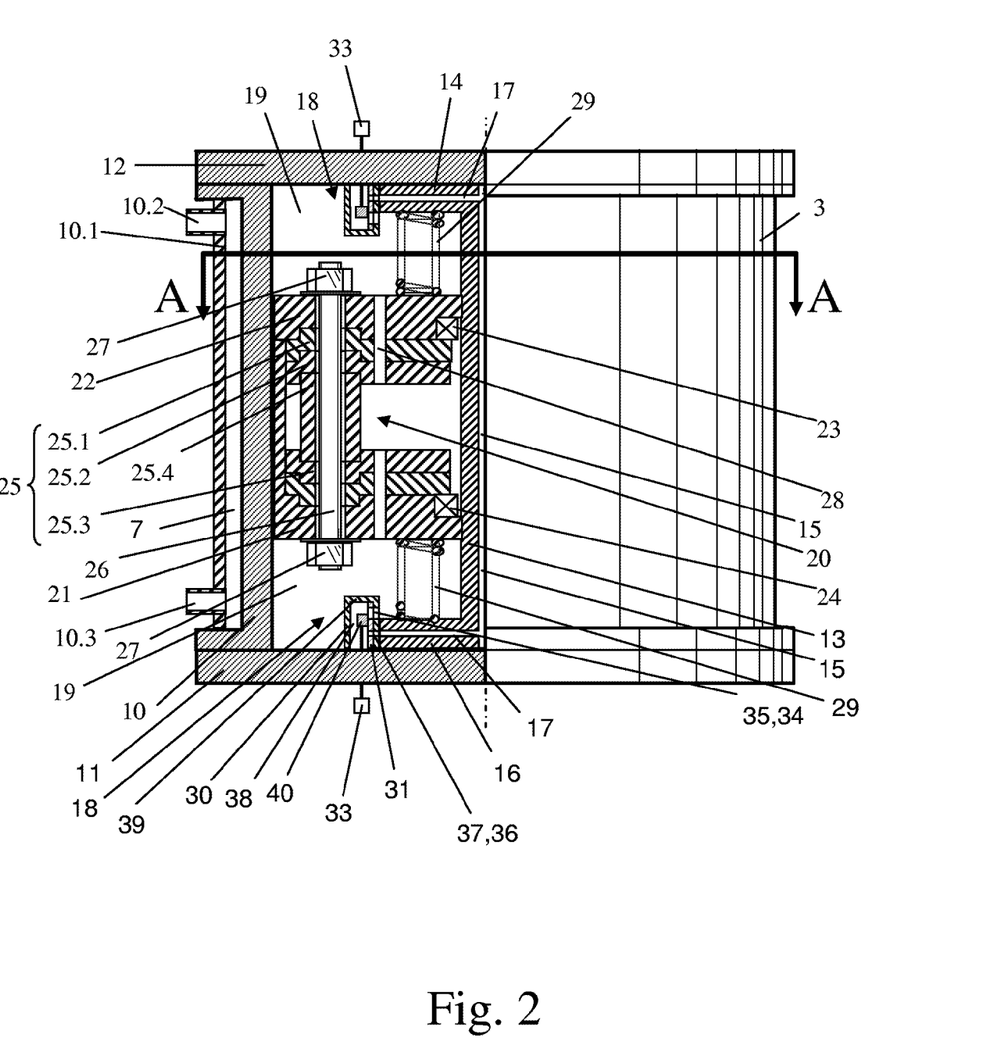
FIG. 2 illustrates the damper of FIG. 1 in cross-section.

FIG. 1 illustrates a piston engine 1 comprising a turbocharger 2. A vibration damper 3 is arranged in connection with the turbocharger 2. The damper 3 is rigidly attached to the charger 2 or its support structures. The vibration damper 3 can be used for reducing the vibration levels of the engine 1 and/or the turbocharger 2 at the desired frequency or frequency area. The vibration damper 3 is provided with a temperature control arrangement 4, 5, 6 by means of which the temperature of the damper 3 can be kept at a desired level. The temperature control arrangement comprises an outer shell 6 surrounding the body 3 of the damper so that a flow space 7 is formed between the body and the outer shell 6, in which the liquid cooling or warming the damper 3 can be circulated (FIG. 2). The flow space 7 is via channels 4 in connection with the medium circulation circuit of the engine 1, such as the lubrication or cooling system. If necessary, the damper 3 can also be provided with a fan 5 for cooling the damper 3.

Figure 3:
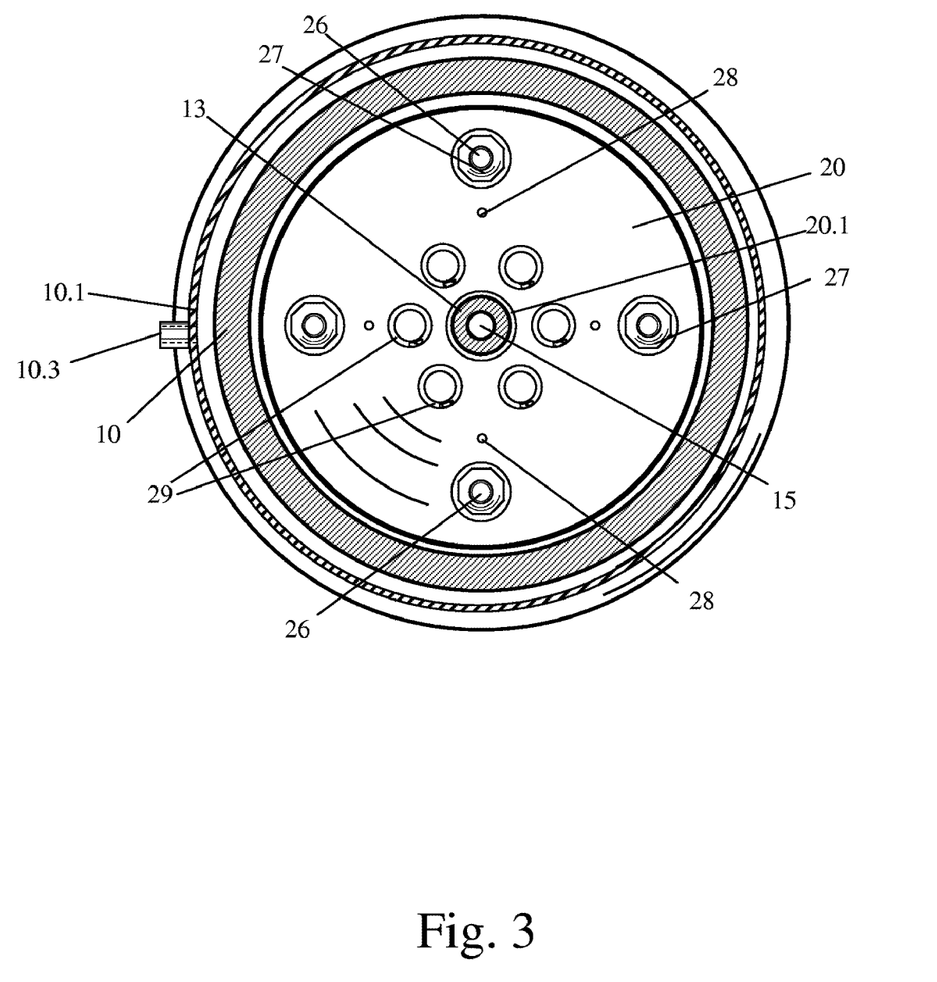
FIG. 3 is cross-section A-A of FIG. 2.

FIGS. 2 and 3 show the construction of a vibration damper 3 of FIG. 1 in more detail. The damper 3 comprises a cylindrical body 10. A first end piece 11 and a second end piece 12 are fastened to the ends of the body 10 by means of, for example, bolts. The body 10 and its end pieces 11, 12 form a closed space 19 filled with a pressure medium, for example gas or liquid, such as oil. The space 19 is provided with an oscillating piece 20 and a guide shaft 13, along which the oscillating piece 20 can move in a reciprocating manner. The first end of the guide shaft 13 is provided with a first fastening flange 16, by means of which the guide shaft 13 is supported to the first end piece 11. The second end of the guide shaft 13 is provided with a second fastening flange 14 by means of which the guide shaft 13 is supported to the second end piece 12. Seen from the direction of the oscillating piece, the fastening flanges 14, 16 are circular. The oscillating piece 20 can, for example, be a piston having a through hole 20.1 through which the guide shaft 13 is provided. The guide shaft 13 is provided on the center axis of the body 10.

The outer surface of the body 10 is surrounded by an outer shell 6 so that a flow space 7 is formed between the body 10 and the outer shell, in which space the cooling or heating medium is circulated. The outer shell 6 is also provided with connection conduits 10.2, 10.3, into which the channels 4 are connected for directing cooling medium into the flow space 7 and away from there. By circulating a cooling or warming medium in the flow space 7 the temperature of the damper 3 can be adjusted and the temperature can be kept at the desired level. The temperature of the damper 3 has an effect on the properties of the dampening medium in the space 19, which further has an effect on the dampening properties of the damper 3.

The oscillating piece 20 is supported by means of a spring system comprising springs 29 to the first 11 and the second end piece 12 either directly or through fastening flanges 16, 14. The spring system comprises a number of individual springs arranged on both sides of the oscillating piece 20. Typically, 4-15 springs are arranged on both sides of the oscillating piece 20.

The oscillating piece 20 is formed by a number of parts which improves the possibilities of tuning the vibration damper. The oscillating piece 20 comprises a bottom part 21 and a cover part 22, both of which are supported on the guide shaft 13 by bearings 23, 24. The oscillating piece 20 further comprises intermediate pieces 25, i.e. adjustment shims (25.1-25.3) arranged between the bottom part 21 and the cover part 22. The intermediate pieces 25, the bottom piece 21, the cover piece 22 and support sleeve 25.4 are fastened to each other by means of threaded rods 26 and nuts 27. When needed, a support sleeve 25.4 of a suitable size can be arranged between the bottom and cover part, the support sleeve maintaining a desired distance between the bottom and cover part. The mass of the oscillating piece 20 can be changed by changing the number of the intermediate pieces 25. It is also possible to produce the intermediate pieces 25 from materials having different densities. Thus, the mass of the oscillating piece 20 can be varied while simultaneously maintaining similar external dimensions. It is, however, important that all parts of the oscillating piece 20 are immovable in relation to each other. The bottom part 21, cover part 22 and the intermediate pieces 25 are rotationally symmetrical in shape and their center of mass is on the center axis of the damper 3.

Flow paths 28 can be arranged in the oscillating piece 20 for the dampening medium filling the space 19, whereby the movement of the oscillating piece 20 can cause it to flow along the flow path.

The guide shaft 13 is provided with a flow channel 15 extending through the guide shaft 13 in the direction of the longitudinal axis thereof. The flow channel 15 further extends through the first fastening flange 16 and the second fastening flange 14. The fastening flanges 16, 14 are provided with radial channels 17 extending from the peripheries of the fastening flanges to the centers thereof, the channels joining the flow channel 15 in the center of the fastening flange. Both fastening flanges 16, 14 have 2-10 radial channels 17.

Figure 4:
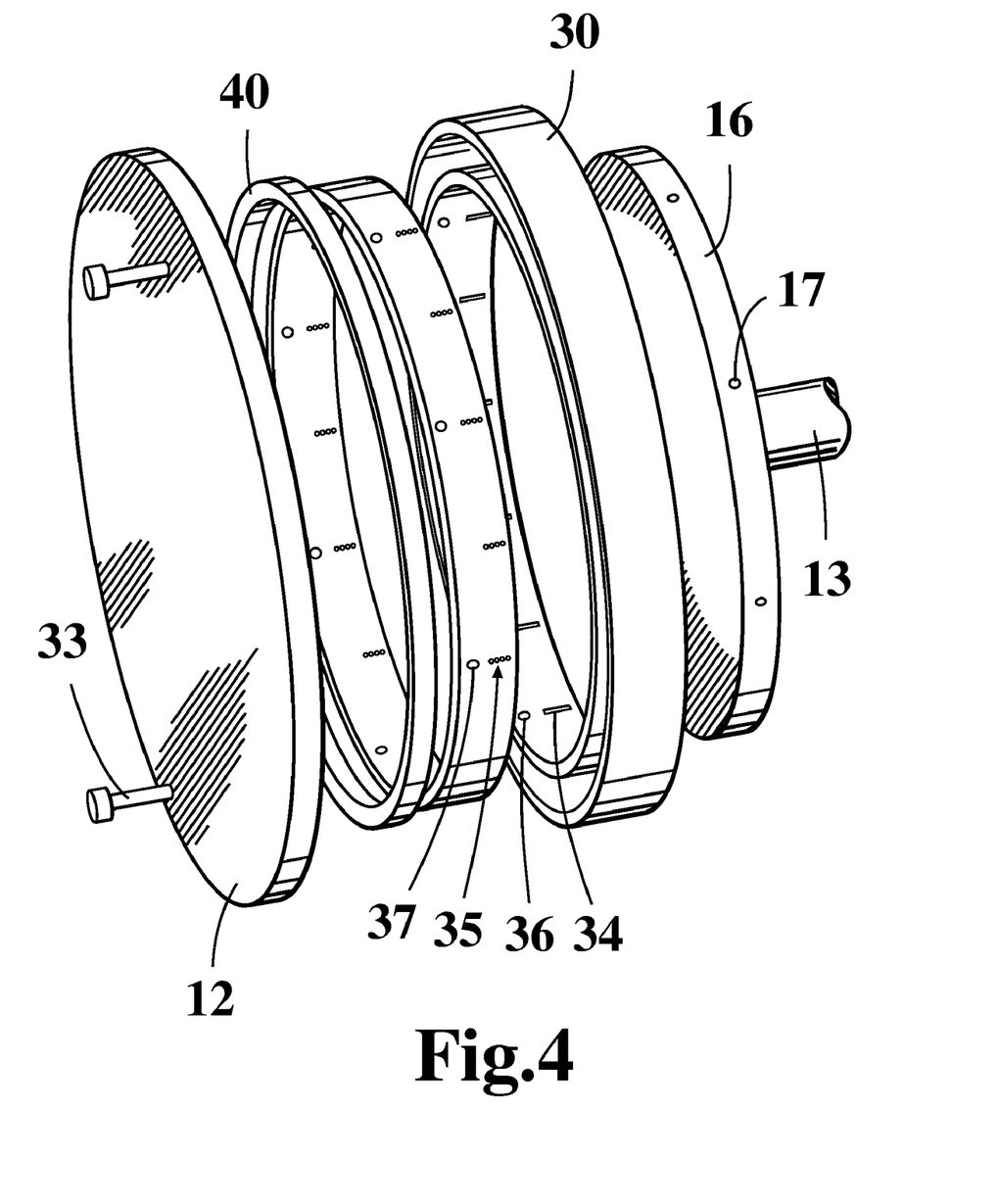
FIG. 4 illustrates the dampening element of the damper of FIG. 2 as an exploded view.
Figure 5:
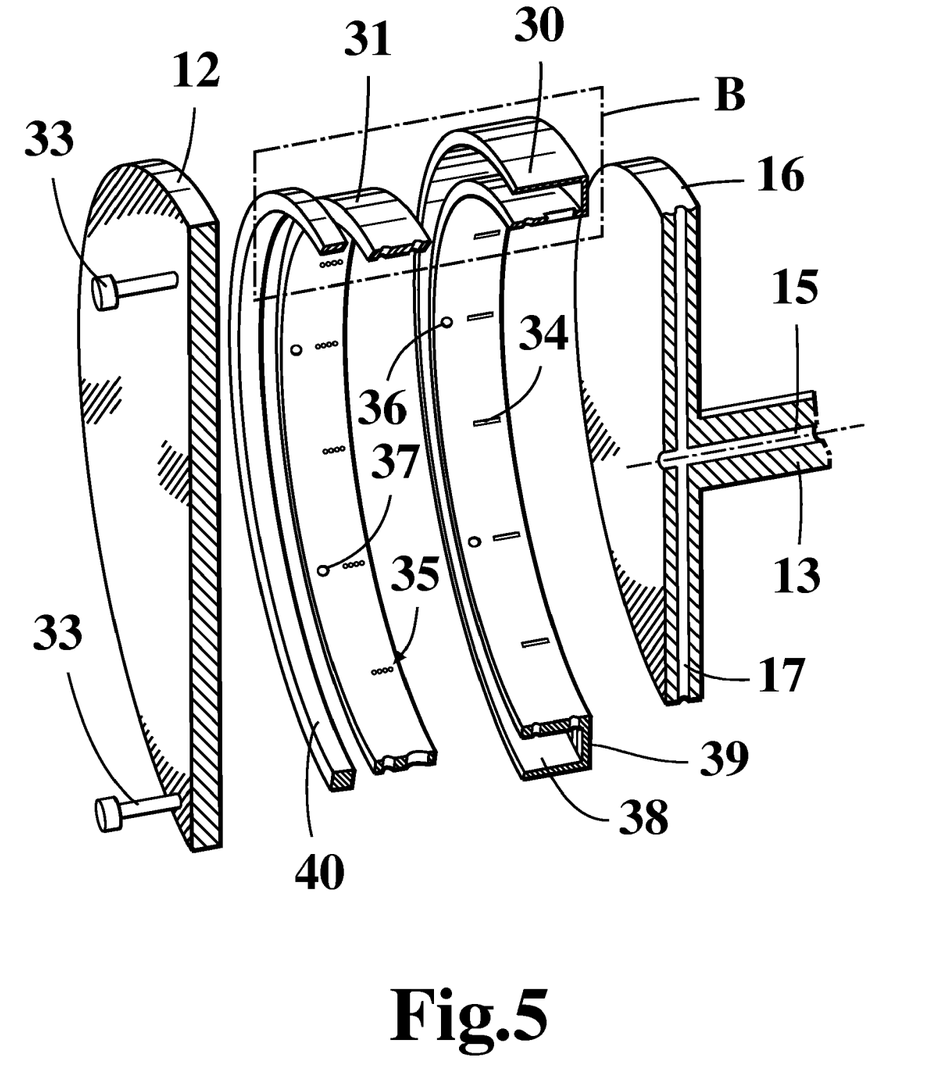
FIG. 5 illustrates the dampening element of FIG. 2 as a cross-sectional exploded view.

A dampening element 18 is arranged around each fastening flange 16, 14 for converting the kinetic energy and pressure energy of the dampening medium in the space 19 into heat energy. The dampening element 18 is arranged against an end piece 11, 12. The dampening element 18 comprises an annular body part 30 having an annular groove 38 having a bottom 39. The inner surface of the body part 30 is arranged against the fastening flange 16, 14. The body part 30 is provided with radial flow openings 34 extending from the inner surface of the body part 30 to the inner edge of the groove 38. The flow openings 34 are rectangular in shape. The body part 30 further includes radially directed second flow openings 36 extending from the inner surface of the body part 30 to the inner edge of the groove 38. The second flow openings 36 are distributed like the radial flow channels 17, whereby the radial channels 17 and the second flow channels 36 can be aligned. The flow openings 34 are closer to the bottom 39 of the groove than the second flow openings 36.

The dampening element 18 also comprises a dampening ring 31 located in the groove 38 of the body part 30. The dampening ring 31 is arranged against the bottom 39 of the groove 38. The inner surface of the dampening ring 31 abuts against inner edge of the groove 38. The dampening ring 31 includes groups of openings comprising radial openings 35, the openings being at least partly aligned with the flow openings 34 of the body part 30. There are at least two, typically 2-8, openings facing each flow opening 34. The cross-sectional flow area of the openings 35 is smaller than that of the flow openings 34. The holes 35 are located on top of each other. The openings 35 are circular in shape. The groups of openings are distributed similarly to the flow openings 34, whereby dampening medium can flow through flow openings 34 and through openings 35 facing them.

The dampening ring 31 also includes second openings 37, the distribution and arrangement is such as to allow them to be arranged aligned with the second flow openings 36, whereby dampening medium can flow through the second holes 37 and the second flow openings 36 to the radial channels 17 or in the opposite direction.

The dampening element 18 further comprises a movable cover ring 40, by means of which the holes 35 of the dampening ring 31 can be partly or wholly covered, thereby changing the dampening parameters of the dampening element 18. The cover ring 40 is arranged around the dampening ring 31 and it can be moved in the axial direction. The cover ring 40 is arranged against the outer surface 31 of the dampening ring 31. The cover ring 40 is narrower than the dampening ring 31 so that it does not cover the second openings 37 of the dampening ring 31. Adjusting screws 33 are attached to the cover ring 40 for steplessly moving the cover ring 40 in relation to the dampening ring 31 and thereby steplessly changing the cross-sectional flow area of the holes 35. The end piece 11, 12 is provided with threaded holes through which the adjusting screws 33 are threaded. The adjusting screws 33 extend to the outside of the space 19, whereby the cover ring 40 can be moved from the outside of the vibration damper 3. The ends of the adjusting screws 33 are fastened to the cover ring 40 so that they are allowed to turn but they do not axially move in relation to the cover ring 40. When the adjusting screws 33 are turned, the cover ring 40 moves axially in the direction corresponding the turning direction of the adjusting screws 33. In an embodiment according to the drawings two adjustment screws are attached to the cover ring 40, but there can also be more adjusting screws, for example 3 to 5.

Figure 6:
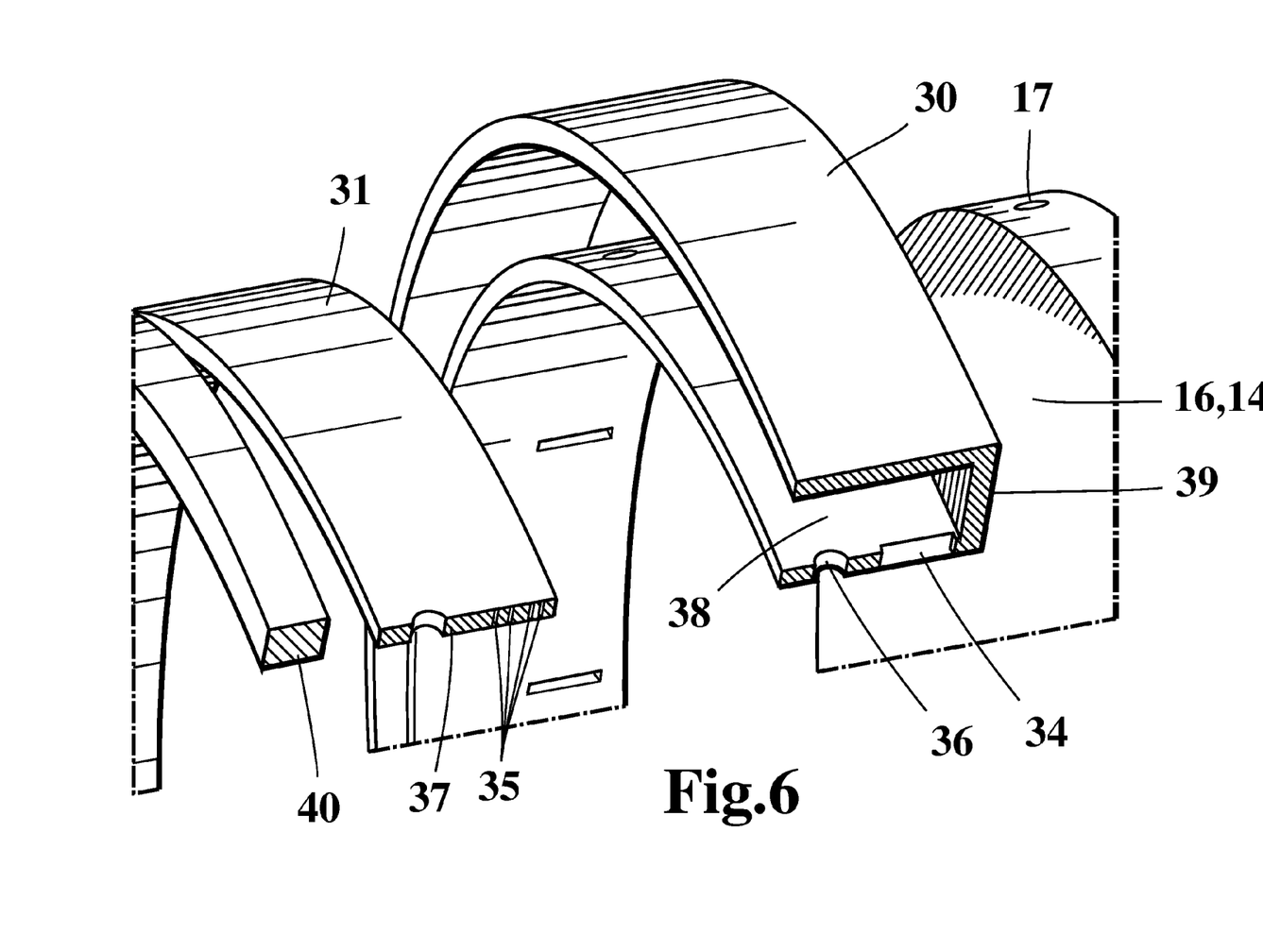
FIG. 6 illustrates, in partial enlargement, the point B of FIG. 5.

The dampening element 18 is arranged around the attachment flange 16, 14 so that the second flow openings 36 of the body part 30 and the second holes 37 of the dampening ring 31 are aligned with the radial channels 17 of the fastening flange. The edges of the groove 38 of the body part 30 are arranged to abut against the end piece 11, 12. The body part 30 extends further into the space 19 than the attachment flange 16, 14 so that the attachment flange does not cover the rectangular flow openings 34 of the body part 30.

The oscillating piece 20 starts to oscillate in the space 19 as the object to be dampened, i.e. the component to which the vibration damper 3 is attached, oscillates. The reciprocating oscillating piece 20 causes the dampening medium in the space 19 to move. As the oscillating piece 20 moves in space 19, dampening medium flows from the space 19 through the flow openings 34 of the body part 30 and through the openings 35 of the dampening ring 31 to the groove 38. From the groove 38 the dampening medium further flows through the second openings 37 of the dampening ring 31 and the second flow openings 36 of the body part 30 to the radial channels 17 of the fastening flange 16, 14. From the radial channels 17 the dampening medium flows along the flow channel 15 of the guide shaft 13 to the radial channels 17 of the other fastening flange and back to the volume 19 to the other side of the oscillating piece 20 through the dampening element as described above. The flow direction of the dampening medium changes to the opposite to that described above as the direction of the movement of the oscillating piece 20 changes. The openings of the dampening element 18 throttle the flow of the dampening medium, whereby kinetic energy and the pressure energy of the dampening medium are converted into heat. The vibration damper 3 transforms vibration energy into heat, formed as the dampening medium flows in narrow throttling points from one space to another forced by the oscillating piece 20.

Should one want to change the dampening properties of the vibration damper 3, the adjustment screws 33 are turned, whereby the cover ring 40 moves axially in relation to the dampening ring 31. Thus, the cross-sectional flow area of the holes 35 of the dampening ring 31 is increased or decreased, whereby the dampening properties of the dampening element 18 are changed. The dampening of the dampening element 18 can be changed by means of the cover ring 40 steplessly between the extreme limits (the holes 35 of the dampening ring wholly open or closed). Should it be desired to change the dampening adjustment limits to outside dampening range allowed by the current dampening ring 31, another type of dampening ring is installed into the groove 38, the ring having a different number of openings and/or openings of a different size. Subsequent to this the fine adjustment of the dampening is carried out as described above by moving the cover ring 40 in relation to the dampening ring 31. Thus the structure having an effect to the dampening of the damper 3 can be kept unchanged.

The dampening properties of the vibration damper 3 can naturally be changed by changing the mass of the oscillating piece 20, the properties of the dampening medium (compressibility, viscosity) and the properties and number of the compression springs 29.

The invention claimed is:

1. A vibration damper for attachment to an object that is subject to vibration, the vibration damper comprising:
    an outer body defining an interior space that contains a dampening medium,
    an oscillatory member fitted slidably as a piston in the interior space and dividing the interior space of the outer body into first and second chambers,
    first and second dampening elements disposed in the first and second chambers respectively of the interior space, wherein each dampening element comprises a body part having flow openings, a dampening part arranged against the body part, the dampening part having openings aligned with the flow openings of the body part, and a cover part arranged against the dampening part, the cover part being movable in relation to the dampening part for changing the cross-sectional flow area of the openings of the dampening part, and wherein as the oscillatory member moves, the dampening medium flows through the flow openings of the body part and the openings in the dampening part whereby the dampening medium dampens the movement of the oscillatory member, and
    a means defining a flow channel between the first dampening element and the second dampening element, whereby as the oscillatory member moves, the dampening medium flows between the first and second chambers via the first dampening element, the flow channel and the second dampening element.

2. A vibration damper according to claim 1, comprising at least one spring supporting the oscillatory member relative to the outer body.

3. A vibration damper according to claim 1, wherein at least the first dampening element comprises means accessible exteriorly of the outer body for moving the cover part relative to the dampening part.

4. A vibration damper according to claim 1, wherein the outer body comprises a cylindrical part and first and second end pieces attached to the cylindrical part, and the means defining the flow channel comprises a flange attached to the first end piece and formed with radial passages aligned with the flow openings of the body part of the first dampening element and a guide shaft extending substantially axially of the cylindrical part and formed with an axial passage that communicates at a first end with the radial passages of the flange and communicates at a second end with said second chamber.

5. A vibration damper according to claim 4, wherein the first dampening element comprises means projecting through the first end piece and accessible exteriorly of the outer body for moving the cover part of the first dampening element relative to the dampening part.

6. A vibration damper according to claim 4, wherein the means defining the flow channel comprises a flange attached to the second end piece and formed with radial passages aligned with the flow openings of the body part of the second dampening element and the axial passage communicates at a second end with the radial passages of the flange attached to the second end piece.

7. A vibration damper according to claim 6, wherein the second dampening element comprises means projecting through the second end piece and accessible exteriorly of the outer body for moving the cover part of the second dampening element relative to the dampening part.

8. A vibration damper according to claim 1, wherein the outer body comprises a cylindrical part and first and second end pieces attached to the cylindrical part, the means defining the flow channel comprises a first flange attached to the first end piece and formed with radial passages, a second flange attached to the second end piece and formed with radial passages, and a guide shaft extending substantially axially of the cylindrical part and formed with an axial passage that communicates with the radial passages of the first and second flanges, the body part of each dampening element is formed with a groove in which the dampening part and the cover part are disposed, the body part of each dampening element has second flow openings and the dampening part of each dampening element has second openings, and the second flow openings of the body part and the second openings of the dampening element are aligned with the radial passages in the flanges.

* * * * *